(12) United States Patent
Fukuyama

(10) Patent No.: US 6,708,920 B2
(45) Date of Patent: Mar. 23, 2004

(54) AIR VEHICLE

(75) Inventor: Koki Fukuyama, Tokyo (JP)

(73) Assignee: New Scientific R&D Institute Inc., Tokyo (JP)

( * ) Notice: Subject to any disclaimer, the term of this patent is extended or adjusted under 35 U.S.C. 154(b) by 0 days.

(21) Appl. No.: 10/303,757

(22) Filed: Nov. 25, 2002

(65) Prior Publication Data

US 2003/0106959 A1 Jun. 12, 2003

(30) Foreign Application Priority Data

Dec. 7, 2001 (JP) ........................................ 2001-374577

(51) Int. Cl.[7] .............................................. B64C 15/12
(52) U.S. Cl. .................. 244/12.4; 244/23 A; 244/23 C; 244/66; 244/56
(58) Field of Search ............................. 244/12.4, 23 C, 244/66, 17.23, 17.25, 23 B, 56, 2, 23 A, 23 R

(56) References Cited

U.S. PATENT DOCUMENTS 5,505,407 A * 4/1996 Chiappetta ..................... 244/2
6,030,177 A * 2/2000 Hager ........................... 416/87
6,254,032 B1 * 7/2001 Bucher ........................ 244/12.2

* cited by examiner

*Primary Examiner*—J. Woodrow Eldred
(74) *Attorney, Agent, or Firm*—Frishauf, Holtz, Goodman & Chick, P.C.

(57) ABSTRACT

Disclosed is an air vehicle (Z) comprising a vehicle body (1); hollow fan ducts (3A–3D) supported to and elongating through the vehicle body at least at its foreside and rear-side locations, respectively. Each fan duct communicates with air at top and bottom of the vehicle body and has a fan (9A–9D) at a top opening (6). The air vehicle further comprises rotary engines (11) each installed inside of each fan duct to rotate the fan. In a preferred embodiment, a cylinder (13) of the rotary engine is mounted to a supporting housing (25) of the fan duct via elastic means (29) which may be fitted to a boss structure (26) of the supporting housing. Each fan duct is tiltable to any directions. Preferably, the fan ducts comprise a pair of front fan ducts (3A, 3B) and another pair of rear fan ducts (3C, 3D) supported to the rear-side of the vehicle body, and the rotary engines in diagonally located fan ducts (3A and 3D; 3B and 3C) are driven to rotate in the same direction.

7 Claims, 6 Drawing Sheets

AIR VEHICLE

BACKGROUND OF THE INVENTION

1. Field of the Invention

The present invention relates to an air vehicle equipped with rotary engines in a vehicle body.

2. Prior Art

A conventional transportation system depends on automobiles moving on a two-dimensional space or plane, resulting in serious traffic-jam problems all over the world. Many efforts such as construction, reconstruction and improvement of road networks have been made but, unfortunately, none of them have been successful to catch up with a considerable increase of the number of automobiles.

Meanwhile, an airplane is flying on a three-dimensional space or air but requires large-scale and expensive infrastructure to take-off and landing. The airplane transportation system is not suitable to a door-to-door travel from one place to another.

SUMMARY OF THE INVENTION

Accordingly, it is a primary object of the present invention to overcome the drawbacks and disadvantages of the prior art transportation systems.

Another object of the present invention to provide a novel transportation system which makes it possible for a user or operator to fly freely in the air to achieve a door-to-door travel as he or she desires.

To achieve these and other objects, according to an aspect of the present invention there is provided an air vehicle comprising a vehicle body; hollow fan ducts supported to and elongating through said vehicle body at least at its fore-side and rear-side locations, respectively, each of said fan ducts communicating with air at top and bottom of said vehicle body and having a fan at a top opening; and rotary engines each installed inside of each of said fan ducts for rotating said fan.

In a preferred embodiment of the present invention, a cylinder of said rotary engine is mounted to a supporting housing of said fan duct via elastic means. In this embodiment, said elastic means may be fitted to a boss structure of said supporting housing.

In another preferable embodiment of the present invention, each fan duct is tiltable to any directions.

In still another preferable embodiment of the present invention, said fan ducts comprise a pair of front fan ducts supported to the fore-side of said vehicle body and another pair of rear fan ducts supported to the rear-side of said vehicle body. In this embodiment, preferably, said rotary engines in one of said front fan ducts and in one of said rear fan ducts located diagonally to said one front fan duct are driven to rotate in the same direction.

In still another preferable embodiment of the present invention, a cooling unit containing coolant is installed around each of the outer cylinder wall of said rotary engines. In this embodiment, said cooling unit may comprise first and second units as a double-layered structure.

BRIEF DESCRIPTION OF THE DRAWINGS

Other objects and advantages of the present invention can be understood from the following description when read in conjunction with the accompanying drawings, in which.

DETAILED DESCRIPTION OF THE PREFERRED EMBODIMENT

Figure 1:
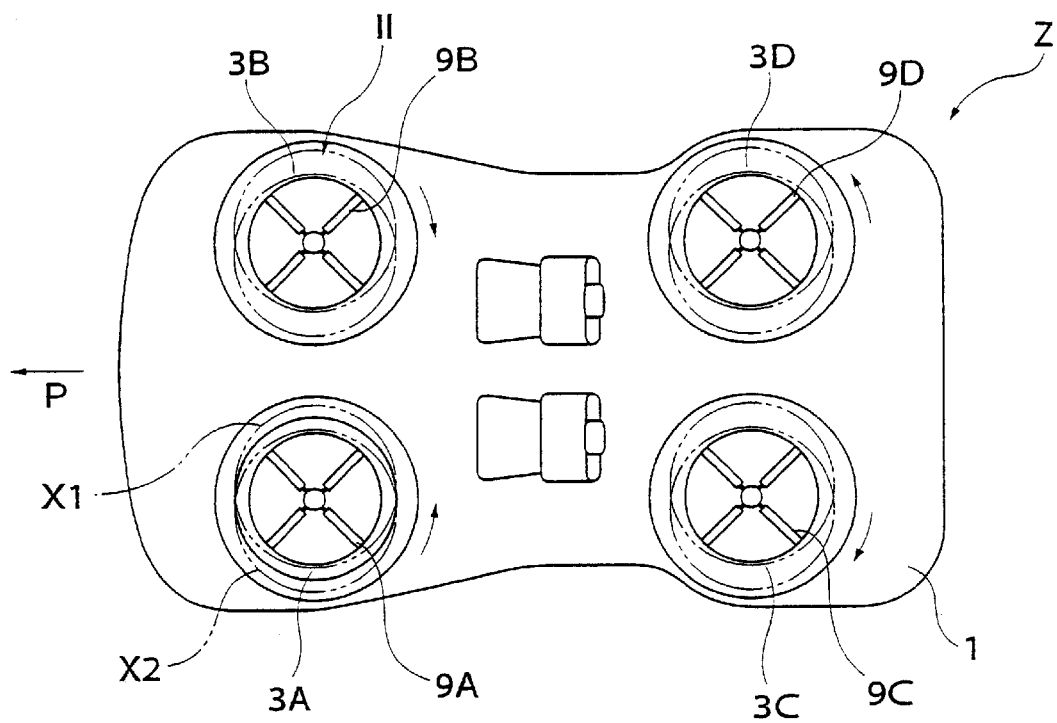
FIG. 1(A) is a plan view of an air vehicle embodying the present invention.
FIG. 1(B) is a front view thereof.

An air vehicle embodying the present invention will be described in detail with reference to the accompanying drawings. For the sake of precaution, identical or functionally similar elements are shown by the same reference numerals throughout several drawings. Any description of a particular element will be applicable to another one shown by the same reference numeral. The arrow P shown in FIGS. 1(A), 1(B) and FIG. 6 indicates the direction of forward movement of the airflow.

A first embodiment of the air vehicle Z according to the present invention is shown in FIGS. 1(A)–3. Fan ducts 3A, 3B, 3C and 3D (which may be referred to by a generic numeral 3 in the following description) are supported to a vehicle body 1 at its foreside and rear-side locations. Each fan duct 3 has a top opening 6 with a rotatable fan 9 and a bottom opening 7. Each fan duct 3 is gimbaled to body 1 to allow tilting movement to any direction.

Figure 2A:
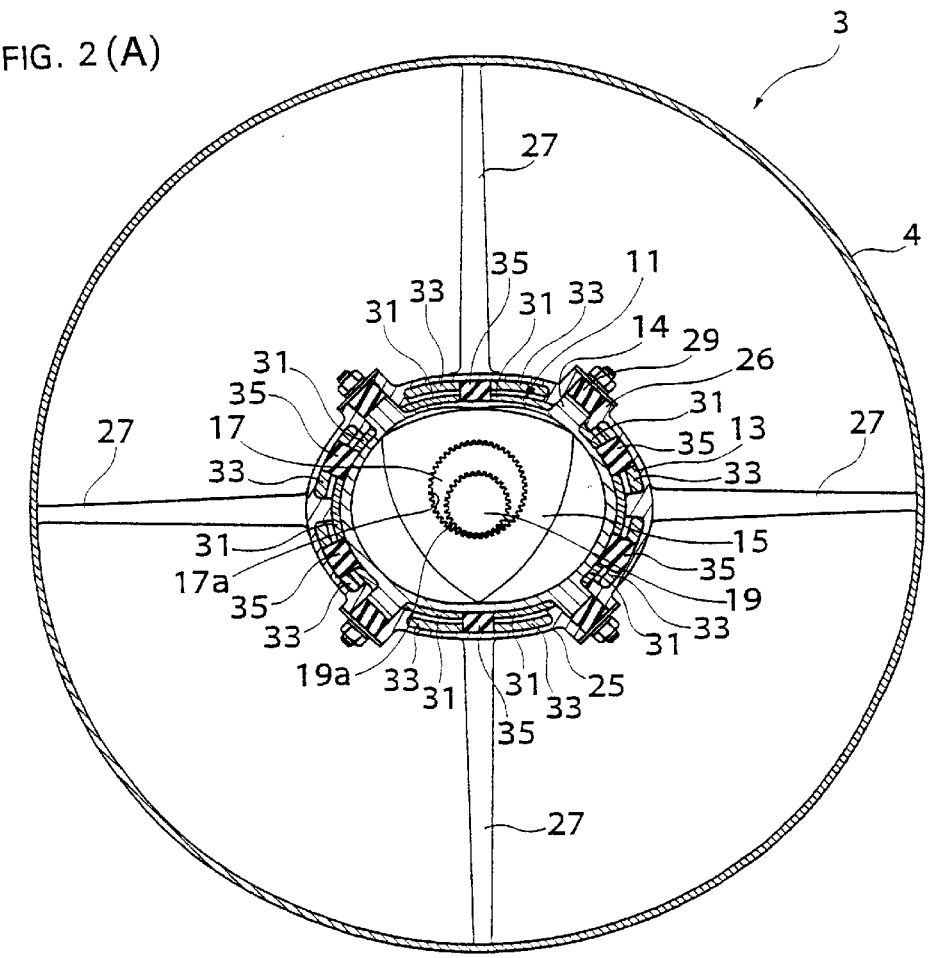
FIG. 2(A) is a sectional view of a rotary engine employed in the air vehicle of FIGS. 1(A) and 1(B)
Figures 2B, 2C:
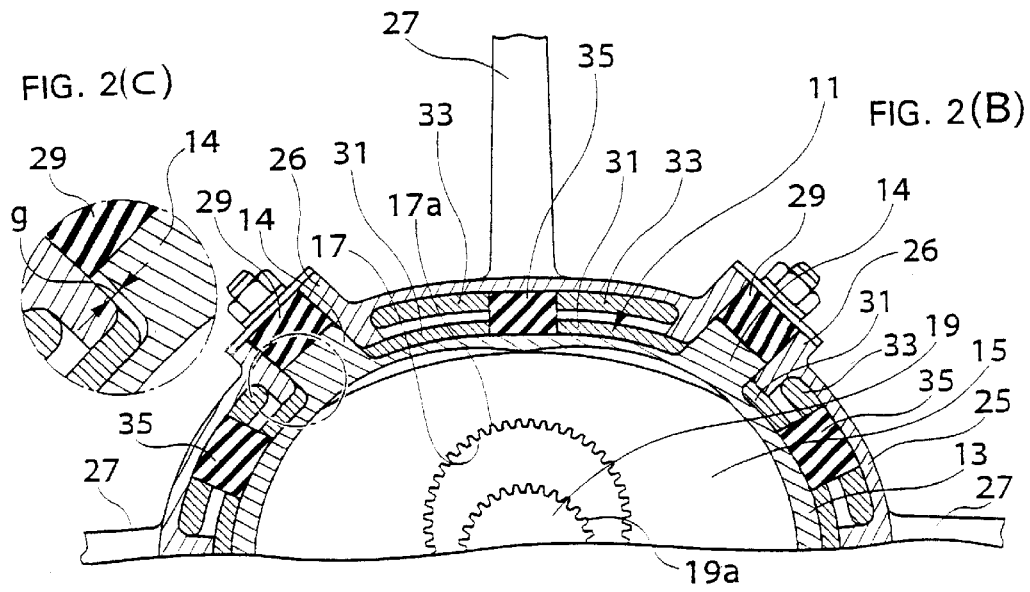
FIG. 2(B) is a partial sectional view thereof on an enlarged scale.
FIG. 2(C) is an enlarged view of the circled portion in FIG. 2(B)

A rotary engine 11 is installed in a hollow interior 4 of each fan duct 3. As shown in FIGS. 2(A) and 2(B), rotary engine 11 includes a cylinder 13 having in general an elliptic cross-section with a pair of opposite concave portions, and at least one rotor 15 made of a relatively thick plate having in general an equilateral triangular shape with slightly rounded sides. Rotor 15 rotates in cylinder 13 with its center of rotation moving with respect to cylinder 13. More specifically there is a circular rotor hole 17 at the center of rotor 15 for inserting a shaft 19. Shaft 19 has a gear 19a at its outer wall, which engages with an inner gear 17a of rotor hole 17. If plural rotors 15 are received in cylinder 13, shaft 19 engages with inner gear 17a of each rotor 15. Shaft 19 is connected via a transmission mechanism 21 to a main drive shaft 23 of fan 9.

Rotary engine 11 is installed approximately at the center of duct 4, as shown in FIG. 2(A). More specifically, within hollow interior 4 of each fan duct 3, there is a supporting housing 25 that accommodates rotary engine 11. Housing 25 is supported to fan duct 3 by means of a plurality of spaced apart supporting frames 27 radially extending in the hollow interior 4 of fan duct 3.

Cylinder 13 has outwardly extending projections 14 for mounting cylinder 13 to supporting housing 25. More specifically, as shown in FIG. 2(B), each projection 14 is fitted tightly within a boss 26 of housing 25, via an elastic member 29 such as rubber, so that cylinder 13 is mounted to housing 25. As particularly shown in the enlarged view of FIG. 2(C), there is a small gap (g) between projection 14 and boss 26, which facilitates smooth fitting operation of cylinder 13 to housing 25. The small gap (g) is also effective to absorb vibration occurring around engine cylinder 13 and thermal expansion of projection 14.

In support housing 25, a first colling unit 31 encapsulates cylinder 13. A second cooling unit 33 surrounds and communicates with first cooling unit 31. A reference numeral 35 indicates an anti-vibration support, made of elastic material, interposed between cylinder 13 and housing 25.

Figure 1B:
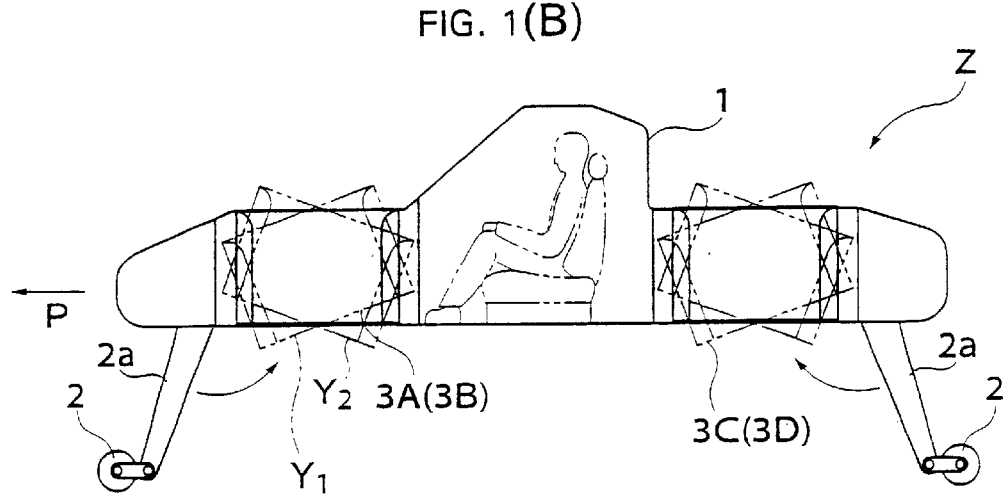

Among four fans 9A–9D installed in fan duct 3, a first pair of fans located in a diagonal relationship are driven to rotate in one and the same direction, whereas a second pair of fans located in another diagonal relationship are driven to rotate in a direction opposite to the direction of rotation of the first pair of fans. For example, as shown in FIG. 1(A), a front-left fan 9A and a rear-right fan 9D in fan ducts 3A and 3D are driven by the respective rotary engines 11, 11, to rotate in a counter-clockwise direction, whereas a front-right fan 9B and a rear-left fan 9C in fan ducts 3B and 3C are driven by the respective rotary engines 11, 11 to rotate in a clockwise direction (the directions and positions being defined as viewed from the top of body 1). In FIG. 1(B), reference numeral 2 indicates spring-biased wheels, including a front pair and a rear pair, which facilitate movement of the air vehicle on the ground and provide a cushioning effect at the time of landing. Each wheel 2 is rotably supported to an end of a foldable leg 2a, as shown by arrows in FIG. 1(B).

A reference numeral 37 indicates a radiator each mounted below rotary engine 11 and supported to fan duct 3 by means of supporting frames 28. A reference numeral 39 indicates a baffle each installed at the lower part of duct 4 for guiding the air to flow toward radiator 37.

The air vehicle Z of the present invention will operate as follows. When rotary engines 11 are driven to rotate the respective rotors 15, rotation of rotors 15 is transmitted to shafts 19 engaging with rotors 15 and then to fans 9 connected to shafts 19 via transmission mechanisms 21, so that fans 9 will rotate. Air enters fan ducts 3 through top openings 5, flows downwardly along the wall of fan duct 4 and is finally jetted out through bottom opening 7. This jet airflow provides a driving force that is enough to take-off and ascending movement of the air vehicle Z.

The air vehicle Z may be piloted and controlled by way of tilting fan ducts 3. To ascend it vertically, air is jetted downward while all fan ducts 3A–3D are kept in vertical orientation. To move forward, all or at least one of fan ducts 3A–3D is tilted into forward movement positions (Y1) shown by imaginary lines in FIG. 1(B). To move backward, all or at least one of fan ducts 3A–3D are tilted into backward movement position (Y2) also shown by imaginary lines in FIG. 1(B). To turn the air vehicle Z to right, all or at least one of fan ducts 3A–3D are tilted to right with respect to a horizontal plane, as shown by imaginary lines (X1) in FIG. 1(A). To turn it to left, all or at least one of fan ducts 3A–3D are tilted to left with respect to the horizontal plane, as shown by imaginary lines (X2) in FIG. 1(A). To let the air vehicle Z descends, revolution of rotary engines 11 should be decreased. To break the air vehicle Z during forward movement, tilting position of one or more of fan ducts 3A–3D should be changed to the backward movement position (Y2). To break the air vehicle Z during backward movement, tilting position of one or more of fan ducts 3A–3D should be changed to the forward movement position (Y1).

By combination of some of the above-mentioned operations, the air vehicle Z may be controlled as desired. For example, the air vehicle Z can move forward and/or turn right or left during take-off ascending.

As described above, in this embodiment, the airflow jetted out downward from fans 9 of fan ducts 3 is utilized as a driving force of the air vehicle Z. Accordingly, the air vehicle Z can move to any direction as desired in a three-dimensional space, including ascending, descending, moving forward and backward, turning right and left. It can make a door-to-door flight from one position to a remote position. It also enables vertical take-off and landing (VTOL) and level flight. Therefore, a transportation system by the air vehicles Z of the present invention will solve the traffic jam problems.

Figure 3:
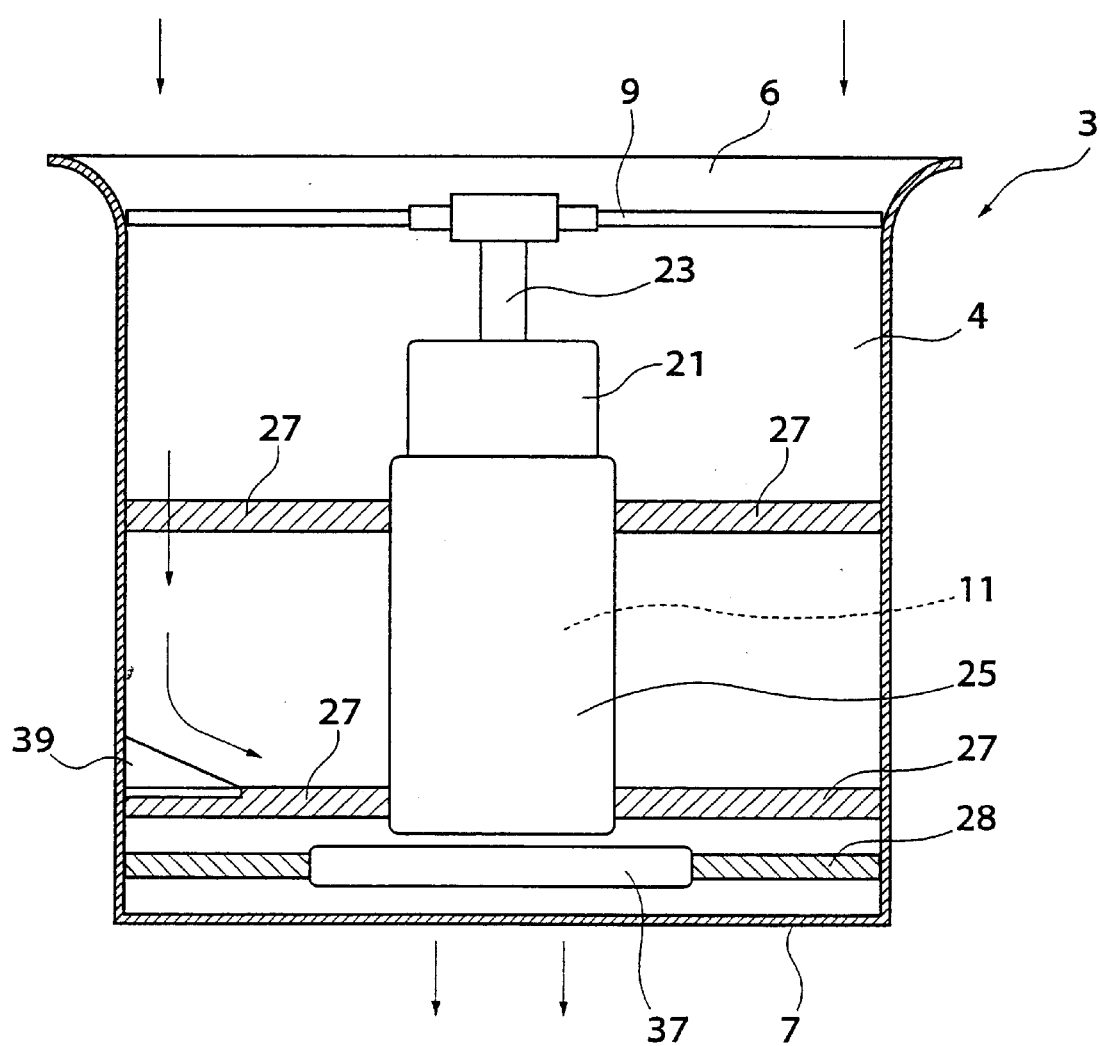
FIG. 3 is a vertical cross-section showing an embodiment of a fan duct that may be used in the air vehicle of the present invention.

The downward air flow along the wall of fan duct 3 is forcibly changed by baffle 39 to the centrally moving air flow toward radiator 37, as shown by arrows in FIG. 3, which effectively facilitates operation of radiator 37. The temperature of the coolant in cooling units 31, 33 is decreased by radiator 37 to a sufficient level, thereby preventing overheat of rotary engines 11.

The above-described embodiment employs four fan ducts 3A–3D each having rotary engine 11, a first pair being positioned at symmetric forward right and left positions. This arrangement contributes to stabilization and controllability of the air vehicle Z, even during vertical movement (ascending and descending), horizontal movement (forward and backward movement, turning to right and left), hovering and braking.

In this embodiment, a pair of fans 9A, 9D in diagonally located fan ducts 3A, 3D are rotated in one and the same direction and another pair of fans 9B, 9C in diagonally located fan ducts 3B, 3C are rotated in a direction opposite to the direction of rotation of fans 9A, 9D. This arrangement provides a good balance to vehicle body 1 and offsets oppositely-directed torsion of vehicle body 1, one being produced by rotation of fans 9A, 9D and the other being produced by opposite-directional rotation of fans 9B, 9C, which makes it easy to achieve a good balance of the air vehicle Z during any kind of movement in the air.

Since each fan 9 is driven by an independent one of rotary engines 11, good stability of the air vehicle Z is maintained even when subject to sudden gusts of wind or any other external conditions that may arise in the air.

Moreover, in this embodiment, a computer (not shown) is used to control the tilting direction of fan ducts 3 and revolution of rotary engines 11 and fans 9. By this, the air vehicle Z has improved controllability.

Rotary engines 11 are used as a driving source that drives the air vehicle Z. This is effective in reduction in size and weight of the air vehicle Z, because rotation of rotors 15 may be directly transmitted to fans 9.

As known, when compared to the reciprocating engine used in many conventional automobiles, the rotary engine has a flat torque characteristic and, therefore, produces less vibration and noise in operation. Still, it is inevitable to generate some vibration and noise during operation of the rotary engine. The air vehicle Z of the present invention that is very small in comparison with conventional airplanes would tend to be influenced by wind or any other environmental factors. The influence by the environmental factors may be amplified by vibration of the air vehicle body, even if it is a negligibly small one for a conventional airplane. Vibration of the air vehicle body may also degrade comfortability. For these reasons, vibration of the air vehicle of the present invention should be reduced as much as possible.

With the air vehicle Z of the above-described embodiment, cylinder 13 of rotary engine 11, a source of vibration, is mounted to supporting housing 25 in such manner that projection 14 is fitted within boss 26 via elastic member 29 and there is anti-vibration support 35 between cylinder 13 and housing 25. Accordingly, vibration of rotary engine 11 is hardly transmitted to fan duct 3. In addition, gap (g) between boss 26 and projection 14 also contributes to preventing transmission of vibration.

A double-layered construction of cooling units 31, 33 reinforces the structure of body 1.

Figure 4:
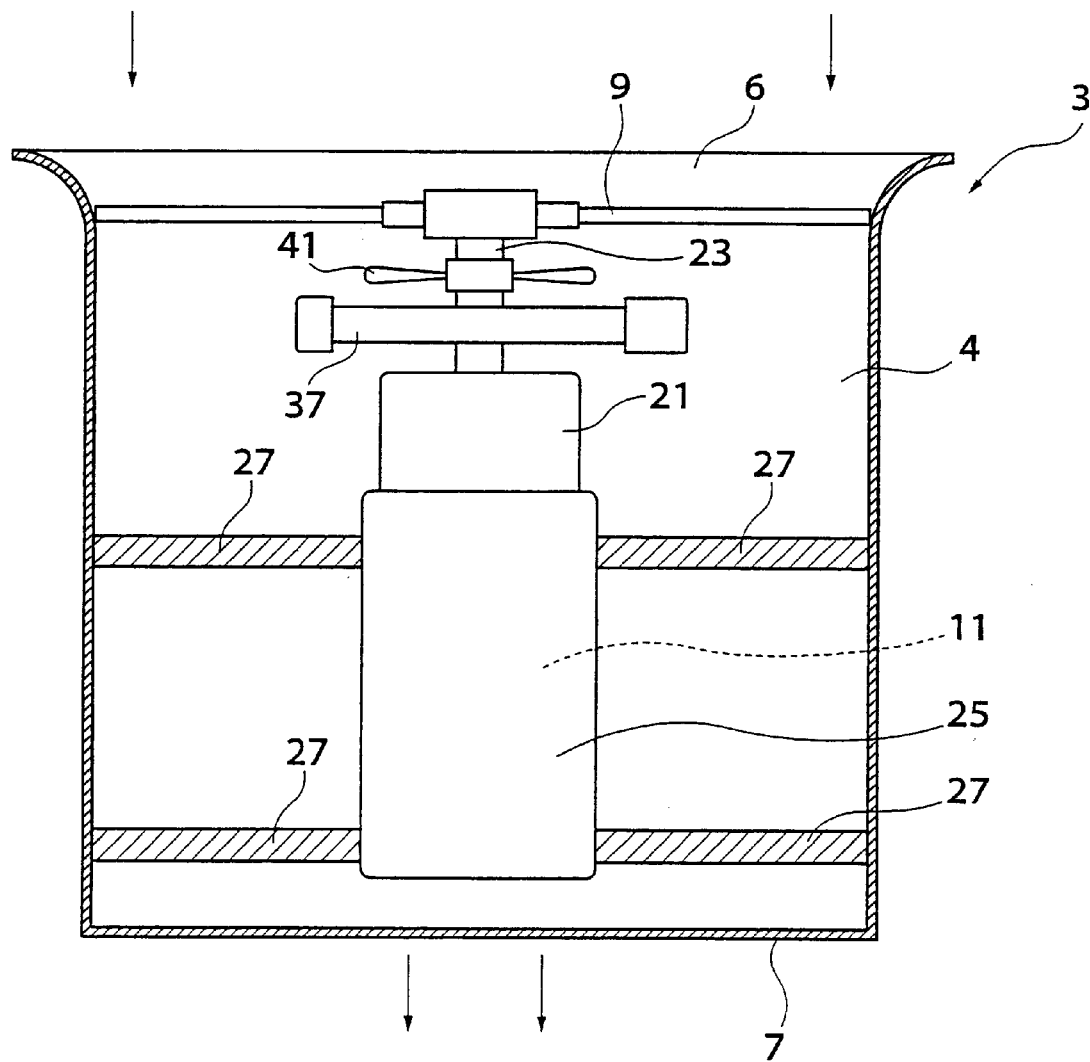
FIG. 4 is a vertical cross-section showing another embodiment of the fan duct usable in the present invention.

FIG. 4 illustrates a second embodiment of the present invention, wherein radiator 37 is installed above rotary engine 11. In this case, an auxiliary fan 41 is to be installed just above radiator 37 so that the airflow entering fan duct 3 is forcibly moved toward cool radiator 37 for cooling. Except for this arrangement and function, the second embodiment is similar to the aforementioned first embodiment and therefore provides the same functions, characteristics and advantages.

Figure 5A:
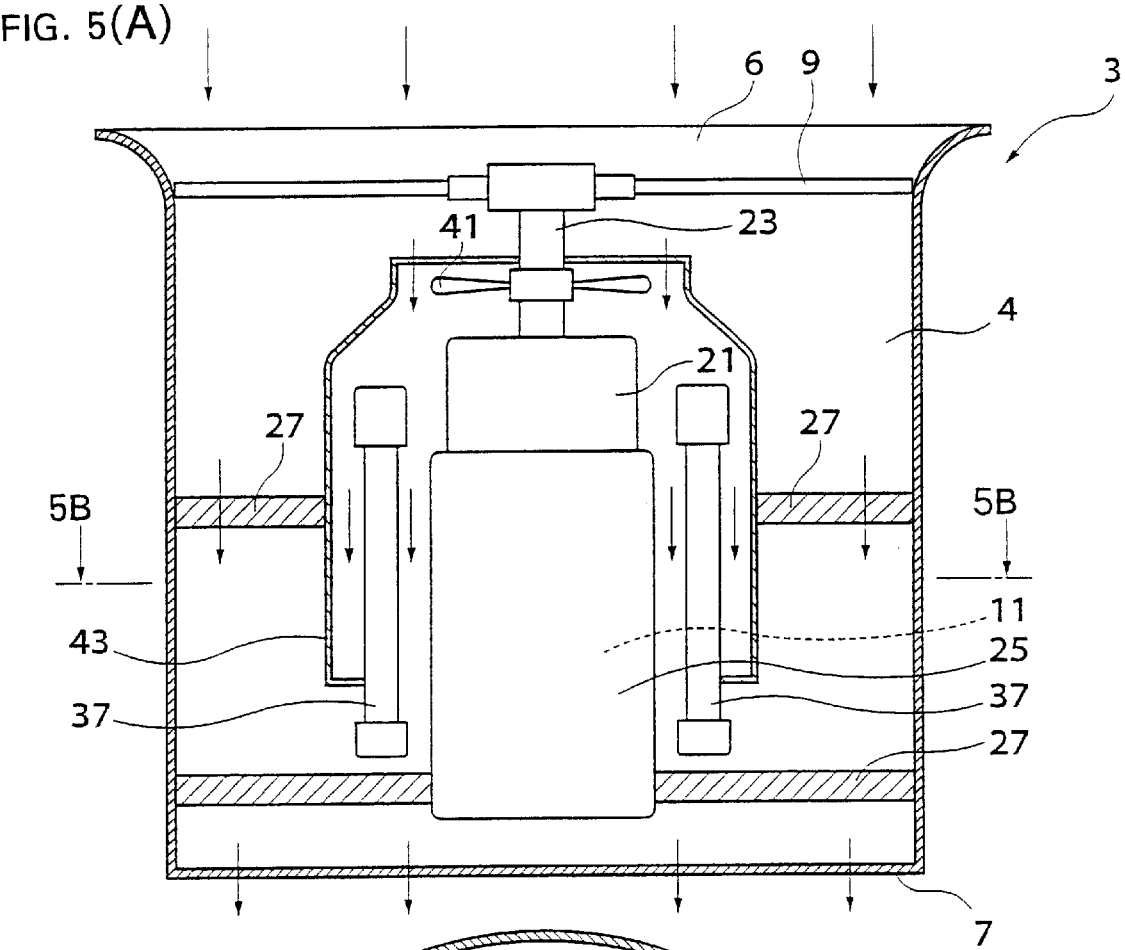
FIG. 5(A) is a vertical cross-section showing still another embodiment of the fan duct usable in the present invention.
Figure 5B:
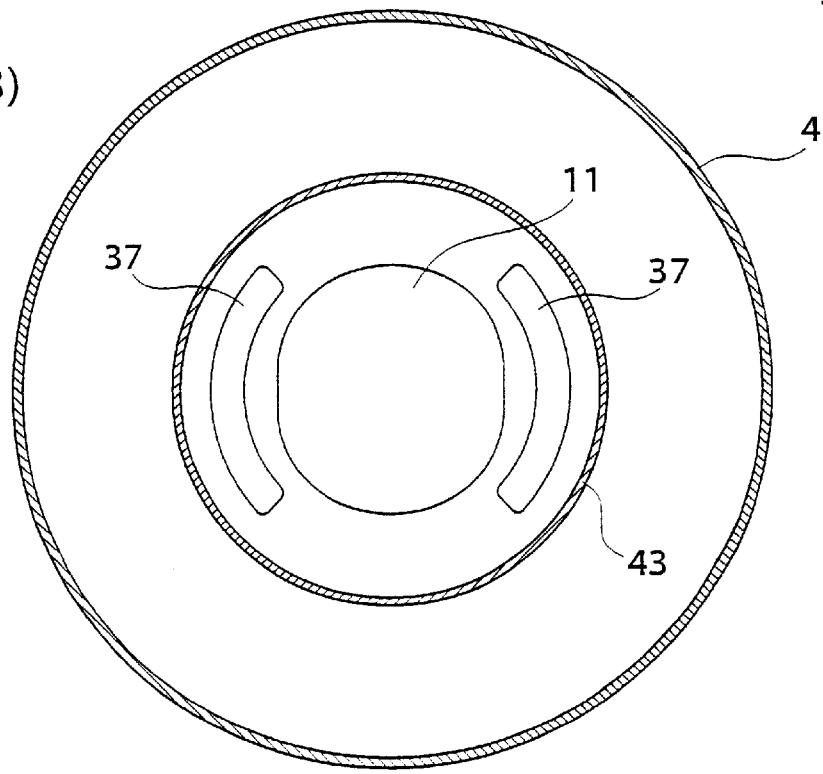
FIG. 5(B) is a horizontal cross-section thereof taken along the line 5B—5B in FIG. 5(A)

FIG. 5 illustrates a third embodiment of the present invention, wherein a pair of radiators are oppositely arranged around rotary engine 11. In this case, an auxiliary fan 41 is installed above radiator 37, and a cowling 43 is used to surround auxiliary fan 41 and radiator 37, whereby the air flow entering fan duct 3 is forcibly moved toward the inside of cowling 43 and then toward cool radiator 37 for cooling. Except for this arrangement and function, the second embodiment is similar to the aforementioned first embodiment and therefore provides the same functions, characteristics and advantages.

Figure 6:
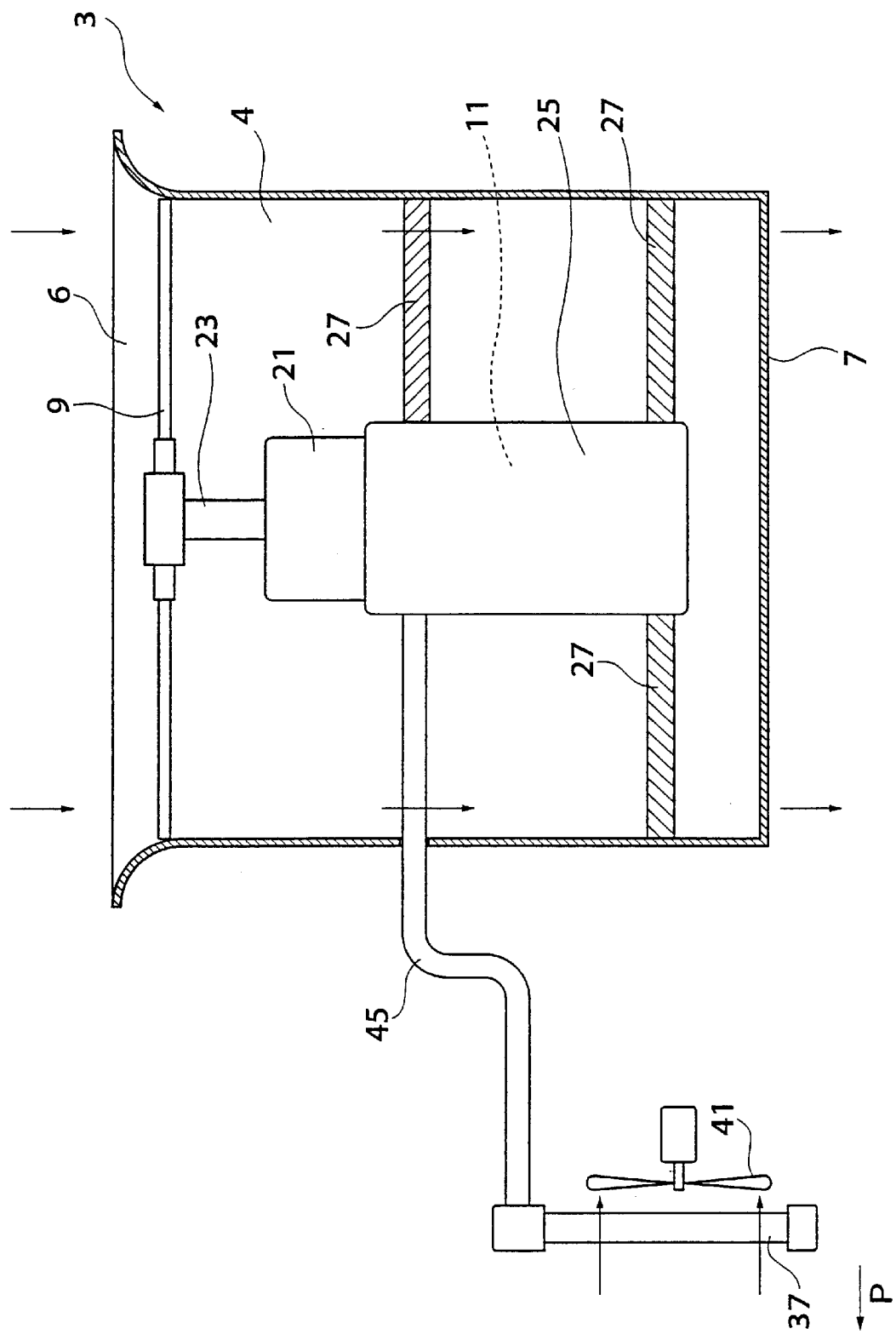
FIG. 6 is a vertical cross-section showing still another embodiment of the fan duct usable in the present invention.

Although a radiator unit is installed in each fan duct in each of the above-described embodiments, a fourth embodiment of the present invention shown in FIG. 6 employs a single radiator unit for all of four fan ducts 3A–3D. The coolant used in each fan duct 3 is transported to a single radiator 37 via a pipe 45. Radiator 37 is installed inside the frame of vehicle body 1 and cooled by the air flow incoming from a direction of movement of the air vehicle Z. An auxiliary fan 41 is installed near radiator 37. In this embodiment, each fan duct 3 may be simplified in construction and reduced in weight, resulting in further size-reduction of the air vehicle Z.

As described above, any suitable method of radiation may be used for rotary engine 11.

Although the present invention has been described in conjunction with specific embodiments thereof, it is to be understood that the present invention is not limited to these embodiments and many modifications and variations may be made without departing from the scope and spirit of the present invention as specifically defined in the appended claims. For example, each of the aforementioned embodiments employs two fan ducts in the forward and rearward pairs, the number of fan ducts may be increased to three or more. Elastic member 29 and anti-vibration support 35 may be made of any desired material. The baffle 39 (FIG. 3) may be installed as a ring that is fitted inside of fan duct 4 at the lower portion thereof. The double layered construction of cooling units 31, 33 is only an embodiment and a single cooling unit may be employed.

What is claimed is:

1. An air vehicle comprising:

a vehicle body;

hollow fan ducts supported to and elongating through said vehicle body at least at its fore-side and rear-side locations respectively, each of said fan ducts communicating with air at a top portion and a bottom portion of said vehicle body and having a fan at a top opening; and rotary engines installed inside each of said fan ducts for rotating said fan;

wherein a cooling unit containing coolant is installed around each of the outer cylinder wall of said rotary engines.

2. An air vehicle according to claim 1, wherein said cooling unit comprises first and second units as a double-layered structure.

3. An air vehicle according to claim 1, wherein a cylinder of said rotary engine is mounted to a supporting housing of said fan duct via elastic means.

4. An air vehicle according to claim 3, wherein said elastic means is fitted to a boss structure of said supporting housing.

5. An air vehicle according to claim 1, wherein each fan duct is tiltable in a plurality of directions.

6. An air vehicle according to claim 1, wherein said fan ducts comprise a pair of front fan ducts supported to the fore-side of said vehicle body and another pair of rear fan ducts supported to the rear-side of said vehicle body.

7. An air vehicle according to claim 6, wherein said rotary engines in one of said front fan ducts and in one of said rear fan ducts located diagonally with respect to said one front fan rotate in the same direction.

* * * * *